United States Patent [19]
Eino

[11] Patent Number: 4,697,208
[45] Date of Patent: Sep. 29, 1987

[54] COLOR IMAGE PICKUP DEVICE WITH COMPLEMENTARY COLOR TYPE MOSAIC FILTER AND GAMMA COMPENSATION MEANS

[75] Inventor: Teruo Eino, Hachioji, Japan

[73] Assignee: Olympus Optical Co., Ltd., Tokyo, Japan

[21] Appl. No.: 868,092

[22] Filed: May 28, 1986

[30] Foreign Application Priority Data

Jun. 13, 1985 [JP] Japan ................................ 60-128987
Jun. 13, 1985 [JP] Japan ................................ 60-128989
Jun. 13, 1985 [JP] Japan ................................ 60-128990

[51] Int. Cl.⁴ ........................ H04N 9/07; H04N 9/69; H04N 9/73
[52] U.S. Cl. ....................................... 358/44; 358/29; 358/32
[58] Field of Search ................... 358/29 C, 41, 43, 44, 358/48, 32

[56] References Cited

U.S. PATENT DOCUMENTS

| 4,227,206 | 10/1980 | Nagumo | 358/44 |
| 4,415,923 | 11/1983 | Noda | 358/41 |
| 4,496,967 | 1/1985 | Sase et al. | 358/44 |
| 4,504,854 | 3/1985 | Masuda | 358/44 |
| 4,638,352 | 1/1987 | Noda et al. | 358/44 |

FOREIGN PATENT DOCUMENTS

| 179082 | 10/1983 | Japan | 358/44 |
| 13487 | 1/1984 | Japan | 358/48 |
| 80087 | 5/1984 | Japan | 358/41 |
| 153391 | 9/1984 | Japan | 358/29 C |
| 219087 | 12/1984 | Japan | 358/29 C |
| 140991 | 7/1985 | Japan | 358/32 |

Primary Examiner—James J. Groody
Assistant Examiner—Randall S. Svihla
Attorney, Agent, or Firm—Frishauf, Holtz, Goodman & Woodward

[57] ABSTRACT

A color image pickup device has a solid-state image sensing element, a complementary color type mosaic filter, and a signal processing circuit which eliminates green highlights and provides accurate hue reproduction for all colors. Gamma compensation circuits process wide- and narrow-band luminance signals and two color signals derived from an output of the image sensing element. The gamma-compensated wide-band luminance signal is combined with a color subcarrier signal modulated by two color-difference signals formed from the gamma-compensated narrow-band luminance signal and the gamma-compensated color signals. The amplitude of the combined signal is limited by a white clip circuit. In one embodiment of the invention, the image sensing element is connected to the signal processing circuit by a cable of shielded lines. Waveform compensation circuits compensate in advance for deformation of the waveform of drive pulses for the image sensing element which occurs when the drive pulses are transmitted through the shielded lines. The external conductors of the shielded lines can be used to transmit power to the image sensing element.

8 Claims, 17 Drawing Figures

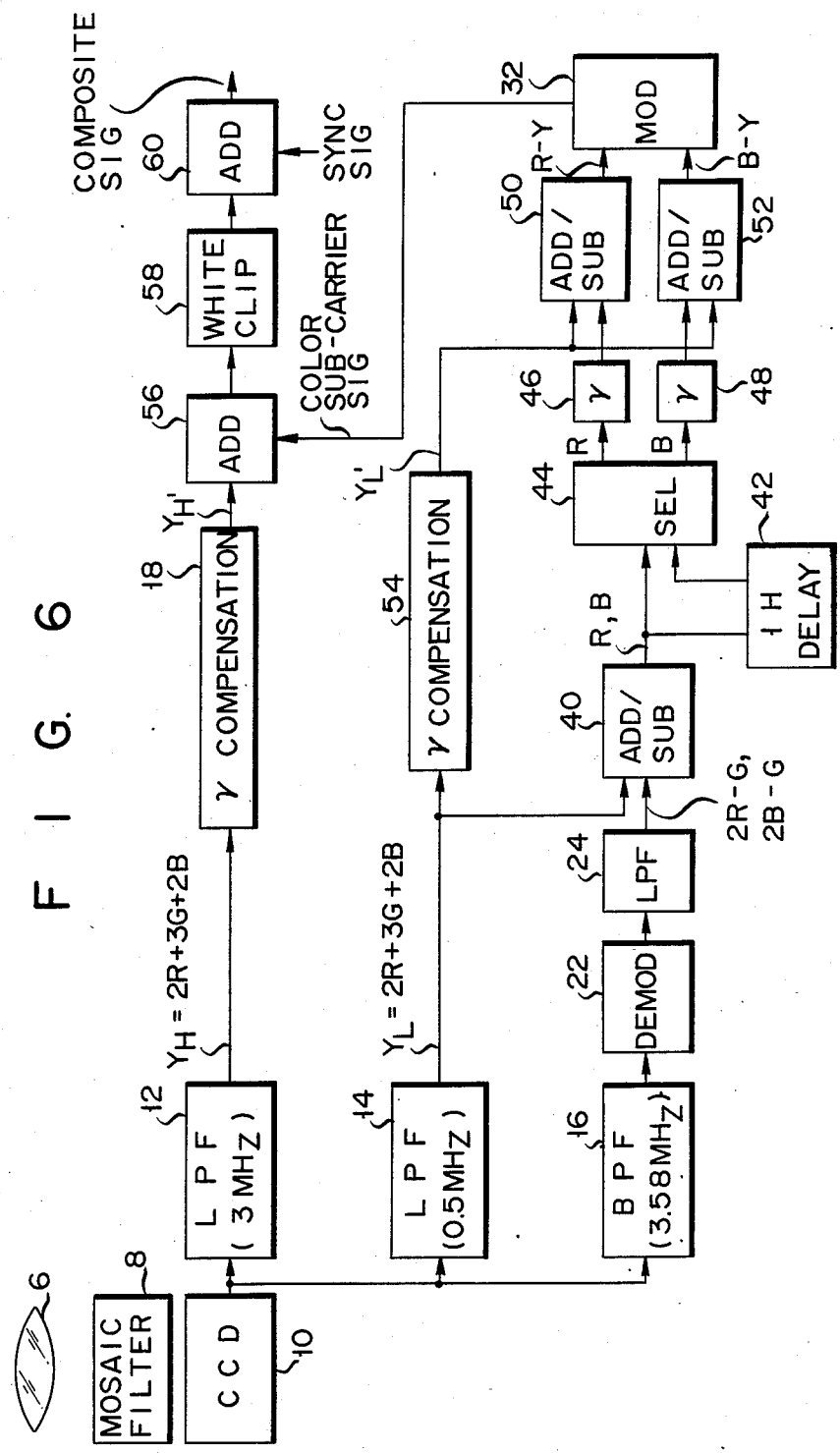
F I G. 6

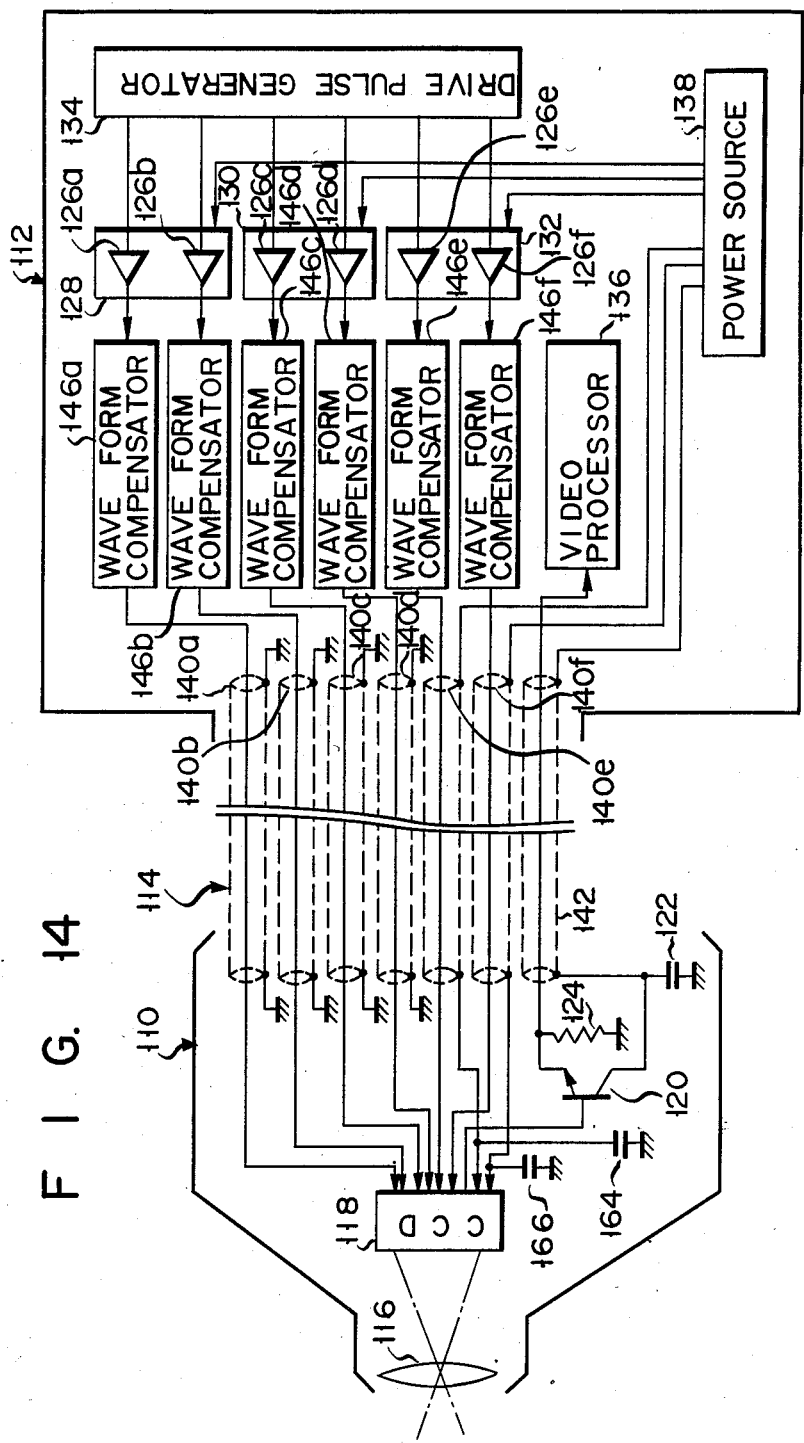
F I G. 14

COLOR IMAGE PICKUP DEVICE WITH COMPLEMENTARY COLOR TYPE MOSAIC FILTER AND GAMMA COMPENSATION MEANS

BACKGROUND OF THE INVENTION

This invention relates to a color image pickup device, and more particularly to a color image pickup device of the single plate type, which uses a solid state image sensing element with a complementary color separation mosaic filter.

To construct a single plate type color imaging device using one solid state image sensing element, it is necessary to apply a mosaic filter for color separation to the imaging surface. This is needed for separating the output signal from solid state image sensing element into a plurality of color components. The mosaic filter has a mosaic array of picture elements (pixels) for color components. The mosaic filter is categorized into a primary color type filter and a complementary color type filter. The primary color type filter is constructed based on the combination of three primary colors, red (R), green (G), and blue (B). The complementary color type filter is based on the combination of a complementary color such as yellow (Ye; allows R and G to transmit therethrough) and cyan (Cy; allows B and G to transmit therethrough) and others, and white (W; allows R, G and B to transmit therethrough, viz. it is transparent) or G. The former is inferior to the latter in sensitivity and resolution. This is because the latter has a high light transmittivity.

The color image pickup device of the single plate type using the complementary color filter is described by Sone et al. in "Color Image Pickup System Using the Single Plate Type CCD in Field Storage Mode", Journal of the Institute of Television Engineers of Japan, Vol. 37, No. 10 (1983).

FIG. 1 shows a block diagram of this conventional single-plate type color image pickup device. The field storage mode means a read-out mode in which the pixel information in two horizontal lines of the filter are read out as the pixel information of one horizontal scanning line, and the two lines are present vertically shifted by one line between A (odd) and B (even) fields. The field storage mode is superior to the frame storage mode in that the former has fewer afterimages. The pixels of the color separation filter are arrayed so that the luminance signals are equal in the each field and line, and at least two kinds of color component information can be obtained from two horizontal lines. This is made so that if two adjacent pixels arrayed in the vertical direction are read out as one pixel, no problem arises. To secure the frequency band of the luminance signal, the pixel array in the horizontal line is repeated every other columns. To this end, a comcolor separation mosaic filter is employed for the color separation filter.

The mosaic filter is made up of basic patterns of pixels which are repetitively arranged vertically and horizontally. In the basic pattern, pixels of Cy, Ye, magenta (Mg; allows R and B to transmit therethrough), and G are arrayed in 4 lines and two columns, as shown in FIG. 2.

An optical image of an object to be imaged, which comes from imaging lens 6, is incident on the imaging surface of a solid state image sensing element, such as CCD 10, through color mosaic filter 8. The imaging signal output from CCD 10 is applied to low-pass filters (LPFs) 12 and 14, and band-pass filter (BPF) 16. The passing bands of LPFs 12 and 14 are 3 MHz and 0.5 MHz, respectively. The center frequency of BPF is 3.58 MHz, and its band width is approximately 1 MHz.

The color elements of color separation filter 8 are arrayed as shown in FIG. 2. Therefore, for each horizontal scanning line, the luminance signal is produced, which contains color components as given by $$(Cy + Ye) + (Mg + G) = (B + G + R + G) + (R + B + G) \tag{1}$$
$$= 2R + 3G + 2B$$

LPFs 12 and 14 produce broad-band (i.e. wide-band) luminance signal $Y_H$ and narrow-band luminance signal $Y_L$. Broad-band luminance signal $Y_H$ is input through gamma ($\gamma$) compensation circuit 18 to video processor 20 for processing the composite video signal. The output signal from BPF 16 is input to adder/subtractor circuit 26 through demodulator 22 and LPF 24. In demodulator 22, an odd-numbered column signal is subtracted from an even numbered column signal, and alternately produces color difference signals as given below. The line designated as an n line in FIG. 2 provides a color difference signal as given by $$(Cy + Mg) - (Ye + G) = (B + G + R + B) - (R + G + G) \tag{2}$$
$$= 2B - G .$$

The n+1 line provides a color difference signal as given by $$(Ye + Mg) - (Cy + G) = (R + G + R + B) - (B + G + G) \tag{3}$$
$$= 2R - G$$

The narrow-band luminance signal $Y_L$ output from LPF 14 is also input to adder/subtractor 26. The color difference signals necessary for the composite video signal are R−Y and B−Y signals. Adder/subtractor circuit 26 multiplies the color difference signals 2B−G and 2R−G, and narrow-band luminance signal $Y_L$ by appropriate coefficients, and adds/subtracts these signals to produce color difference signals R−Y and B−Y. Demodulator 22 alternately produces the color difference signals 2B−G and 2R−G signals every scanning line. Accordingly, adder/subtractor 26 also alternately produces the color difference signals B−Y and R−Y every scanning line. For this reason, the output signals of the two lines from adder/subtractor circuit 26 are averaged by using 1H (one horizontal scanning period) delay circuit 28 and line select circuit 30. The color difference signal of each line is delayed by the 1H period, and together with the color difference signal of the next line, is output from line select circuit 30.

The color difference signals R−Y and B−Y output from line select circuit 30 are modulated by modulator 32 (with a center frequency of 3.58 MHz), to form a color subcarrier signal.

The color subcarrier signal is supplied to video processor 20. The video processor 20 forms a composite video signal using the color subcarrier signal, the broad-band luminance signal $Y_H'$ output from gamma compensation circuit 18, and the synchronizing signal.

In the conventional color image pickup device, the gamma compensation is applied only for the broad-band luminance signal $Y_H$. Since the luminance signal has a great correlation to the G signal, therefore, it can be considered that the gamma compensation was applied almost exclusively to the G component of R, G and B components. Therefore, the color image pickup device with unsatisfactory hue reproduction is unable to image sense the color components of all colors accurately.

The color filter of the complementary color type as shown in FIG. 2 involves the problem of high light green or green highlights.

The saturation characteristics of the color components Ye, Mg, Cy, and G, which constitute the complementary color filter, are different from one another, as shown in FIG. 3A. The primary color signals of the additive color system are obtained from the output signals Ye, Mg, Cy and G of the image sensing elements with the complementary color filter, by an appropriate operation. For example, for obtaining the R signal, the following equation (4) is used.

$$(Ye+Mg)-(Cy+G)=2R-G \quad (4)$$

Rearranging the above equation, we have $$Ye+Mg-Cy=2R \quad (5).$$

As seen from the equation (5), in the range where any component signals of Ye, Mg, Cy and G are not saturated, viz. the intensity of incident light is less than I1, the amplitude of the signal R is proportional to the incident light intensity as shown in FIG. 3B. When only the Ye signal is saturated, the proportional coefficient of the R signal is decreased. When the Mg signal enters the saturation range, viz. the incident light intensity exceeds I2, only the component of Cy increases, so that the R signal decreases as seen from the equation (5).

When the intensity of light changes during the imaging of the same object, the primary color component, for example, the R signal, must be proportional to the incident light intensity. However, as described above, if the incident light intensity exceeds a predetermined value, the proportional relationship does not hold, so that the R signal is smaller than its proper value. Therefore, the primary colors other than the R are more intensive, presenting light sea green of the reproduced image. In other words, the so called high light green phenomenon occurs.

To prevent this phenomenon, the difference of the saturation characteristics of the complementary color component signals is compensated for using amplifiers with different amplification factors. An conventional example of such compensating approach is shown in FIG. 4. As shown, the output signal of CCD 10 is selectively applied to one of saturation type amplifiers 36a to 36d with different saturation levels through multiplexer 34. The CCD 10 is provided with a complementary type color filter using four colors Ye, Mg, Cy and G, which is of the above-mentioned type. As well known, the saturation type amplifier is saturated in its output signal when its input signal exceeds a predetermined value. The multiplexer 34 is switched every pixel, to allow the pixel signals of the color components Ye, Mg, Cy and G to be respectively supplied to saturation type amplifiers 36a to 36d. The input/output characteristics of the amplifiers 36a to 36d as for the color components Ye, Mg, Cy and G are shown in FIG. 5. As shown in FIG. 3A, of those color component signals Ye, Mg, Cy and G, the Ye signal are saturated for the least intensity of the incident light. Since the saturation type amplifiers 36a to 36d have different input/output characteristics, when the Ye signal is saturated, the remaining three color components of Mg, Cy and G are simultaneously saturated. In other words, the incident light intensities at which the respective color component signals output from amplifiers 36a to 36d are saturated, are the same. The output signals from the amplifiers 36a to 36d are applied through multiplexer 38 to LPFs 12 and 14, and BPF 16. The multiplexers 34 and 38 are interlocked with each other.

High cost and high performance multiplexers must be used for the multiplexer of this saturation difference compensating device, because a high speed operation is required for the multiplexers. Further, the amplifier is used for each color component, resulting in complexity of the circuit arrangement.

Size reduction is required for the camera head. This is true particularly for the color image pickup device applied for medical equipment such as electronic endoscopes. To meet this requirement, the camera head containing CCD, for example, and the camera controller for processing the picked up image signal are provided separately. Nevertheless, the size reduction of the camera head is unsatisfactory, because the driver IC for CCD, together with CCD, is contained in the camera head. This IC is also contained in, for example, the 8-pin DIP package, since it emits a large amount of heat. Usually, it is necessary to apply a multi-phase (not less than three-phase) driving signal to CCD, and hence at least three ICs are required. This brings about the increased size of camera head. Additionally, if the heat of the IC is transferred to the CCD, the dark current of the CCD increases, causing noise. For this reason, the drive IC must be separated from the CCD. This fact also leads to the increase of the camera head size.

SUMMARY OF THE INVENTION

Accordingly, an object of the present invention is to provide a color image pickup device of the single plate type which uses a solid state image sensing element with a complementary color separation filter, which can perform the gamma compensation equally for all of the color components, and reproduce hue faithfully.

Another object of the present invention is to provide a color image pickup device of the above type, which can prevent the high light green with a simple construction.

A yet another object of this invention is to provide a color image pickup device of a small size, in which the camera head and the camera control are separately installed.

According to this invention, there is provided a color image pickup tube comprising a solid state image sensing element having a complementary color mosaic filter, an extracting circuit for extracting a luminance signal and a first color difference signal from the output signal of the solid-state image sensing element, a first compensation circuit for compensating for a gamma characteristic of the output luminance signal from the extracting circuit, a first adder/subtractor for generating a first color signal on the basis of the output luminance signal of the extracting circuit and the first color difference signal, a second compensation circuit for compensating for a gamma characteristic of the first color signal, and a second adder/subtractor for generating a second color difference signal on the basis of the output luminance signal of the first compensation circuit and the first color signal output from the second compensation circuit.

BRIEF DESCRIPTION OF THE DRAWINGS

FIG. 6 is a block diagram of a first embodiment of a color image pickup device according to the present invention;

FIG. 14 shows a block diagram of sixth embodiment of a color image pickup device according to the present invention.

DETAILED DESCRIPTION OF THE PREFERRED EMBODIMENTS

Figure 1:
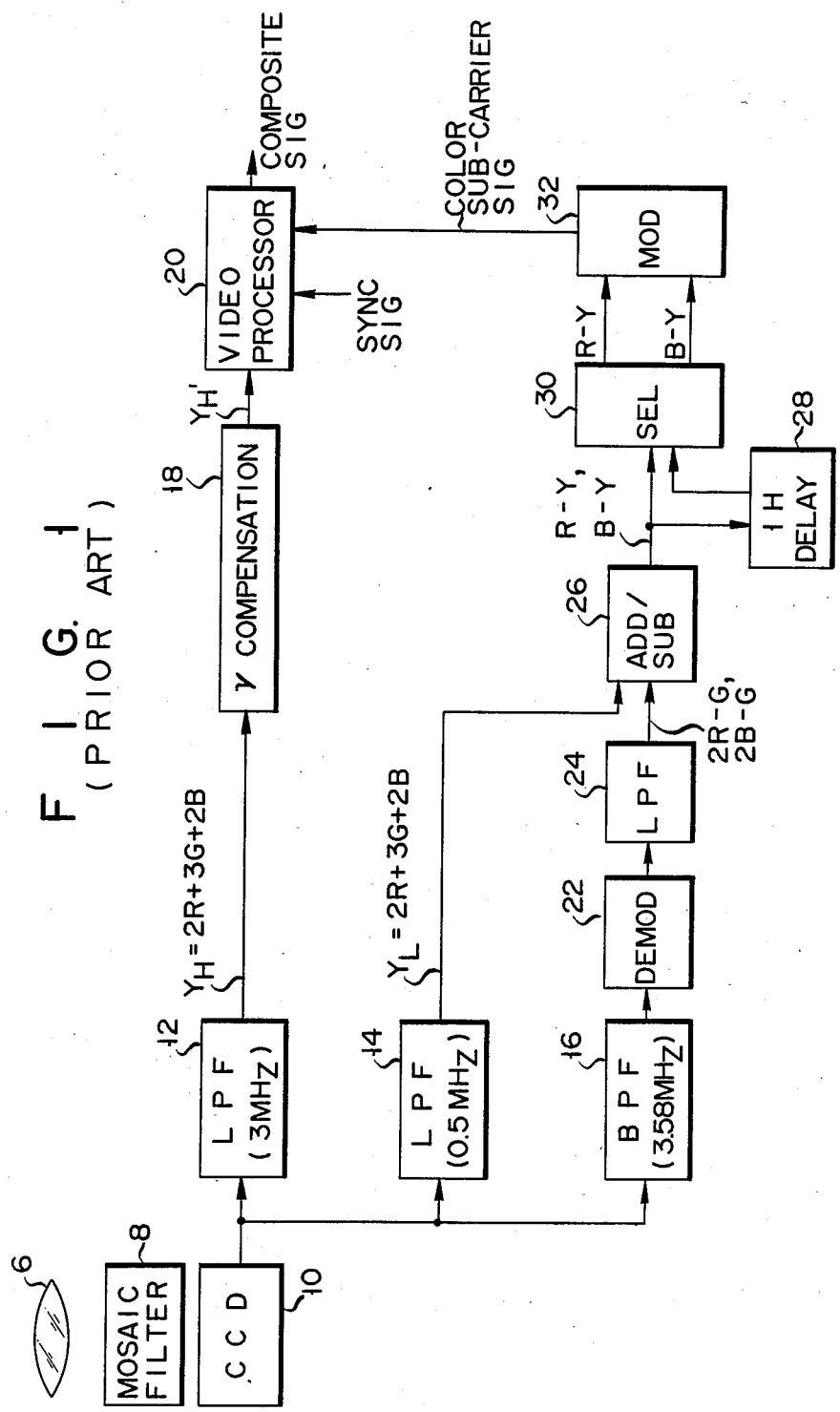
FIG. 1 is a block diagram of a conventional color image pickup device of the single plate type using a complementary color separation filter.
Figure 2:
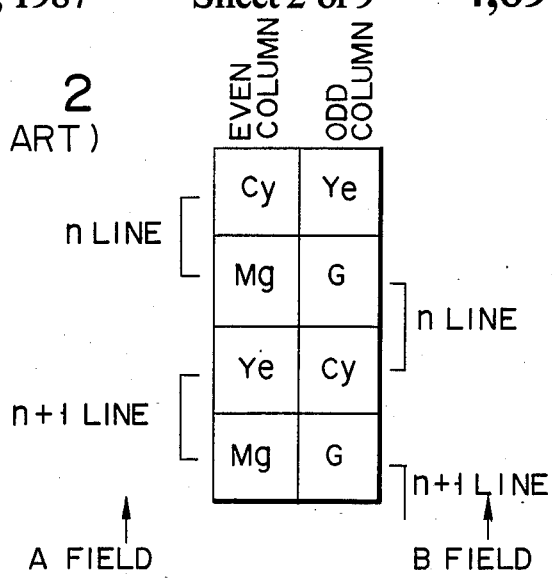
FIG. 2 shows a plan view of the color separation filter of FIG. 1.

An embodiment of a color image pickup device according to the present invention will be given referring to the accompanying drawings. FIG. 6 shows a block diagram of a first embodiment of the present invention. Throughout the drawings, like symbols are used for designating like or equivalent portions, for simplicity. An optical image of an imaged object as coming through image pickup lens 6 is incident upon the image sensing surface of CCD 10 via color mosaic filter 8. The output signal from CCD 10 is supplied to LPFs 12 and 14, and BPF 16.

LPFs 12 and 14 produces broad-band luminance signal $Y_H$ and narrow-band luminance signal $Y_L$. These signals $Y_H$ and $Y_L$ are each expressed by $2R+3G+2B$. The broad-band luminance signal $Y_H$ output from LPF 12 is input to adder 56, through gamma ($\gamma$) compensation circuit 18. The output signal from BPF 16 is input to adder/subtractor circuit 40, via demodulator 22 and LPF 24. Demodulator 22 alternately produces color difference signals $2R-G$ and $2B-G$ every scanning line. The narrow-band luminance signal $Y_L$ output from LPF 14 is also applied to adder/subtractor circuit 40. Adder/subtractor 40 multiplies the color difference signals $2R-G$ and $2B-G$, and the narrow-band luminance signal $Y_L$ by a coefficient which is different from that of the conventional device, and produces color signal R and B, not the color difference signal.

In the visual characteristic, the magnitude of the luminance has a great correlation with that of green. The transmittivity of each color component of the color separation mosaic filter, which is used by CCD, is selected considering the above correction. Therefore, the luminance signal Y has a great correlation with the green signal G. On the basis of this face, we can approximately obtain red and blue signals. To effect this, luminance signal $Y_L$ is used in place of the green signal G in adder/subtractor 40, and the term G is eliminated from $2R-G$ and $2B-G$.

Since demodulator 22 alternately produces color difference signals $2R-G$ and $2B-G$ for each line. Accordingly, the output color signal from adder/subtractor circuit 40 alternately becomes the signals R and B for each line. Therefore, it is necessary to delay the output signal of one line by the 1H delay circuit 42 and to selectively output the delayed signal and nondelayed signal from line select circuit 44. The color signals R and B output from line select circuit 44 are supplied to adder/subtractor circuits 50 and 52, by way of gamma compensation circuits 46 and 48. The narrow-band signal $Y_L$ output from LPF 14 is also supplied to adder/subtractor circuits 50 and 52, through gamma compensation circuit 54. Adder/subtractor circuits 50 and 52 respectively subtract the narrow-band luminance signals $Y_L'$ from the gamma compensated color signals R and B, thereby to generate color difference signals $R-Y$ and $B-Y$. These color difference signals are modulated by modulator 32 (centered at 3.58 MHz), to generate a color subcarrier signal.

The color subcarrier signal is added to the broad-band luminance signal $Y_H'$ output from gamma compensation circuit 18, by means of adder 56. The output signal from adder 56 is supplied through white clip circuit 58 to adder 60, where it is added to the synchronizing signal, thereby to generate a composite video signal.

As described above, according to the first embodiment, the adder/subtractor 40, which arithmetically operates the color difference signals $2R-G$ and $2B-G$ as obtained by demodulator 22 and the narrow-band luminance signal $Y_L$, does not generate color difference signals $R-Y$ and $B-Y$, unlike the conventional circuit, but generates color signals (primary color signals) R and B. These color signals R and B are supplied to gamma compensation circuits 46 and 48, respectively. The luminance signals $Y_H$ and $Y_L$ filtered out from LPFs 12 and 14 are also supplied to gamma compensation circuits 18 and 54. From those gamma compensated color signals R and B, and the luminance signals, the color difference signals $R-Y$ and $B-Y$ are obtained. Since the gamma compensation is applied to all of the color components R, G and B, hue is reproduced faithfully. In this respect, good color reproduction is ensured.

The composite video signal (the output signal from adder 56) as formed by adding together the luminance signal and the color subcarrier signal is amplitude limited through the white clip circuit 58. Therefore, even if the signal of each color component is saturated as the result of increasing of the intensity of light, there is no case that only the component of light sea green is left. In this respect, the high light green phenomenon is successfully prevented. Therefore, unlike the conventional case, there is no need for provision of the saturation type amplifiers whose amplification factors are different for the color components. Further, there is eliminated the high speed multiplexer which is switched for each pixel. As a result, the circuit arrangement is simple, and the cost to manufacture is low.

In this embodiment, not only the luminance signal, but also the color subcarrier signal is limited in amplitude. As a whole, the image signal is limited only in the amplitude, while remaining white, without any emphasis of a specific color.

Figure 3A:
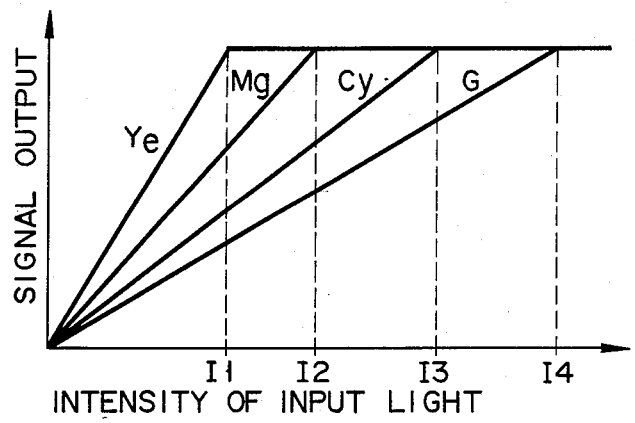
FIGS. 3A and 3B show graphs for explaining the high light green phenomenon which is a disadvantage of the prior device.
Figure 3B:
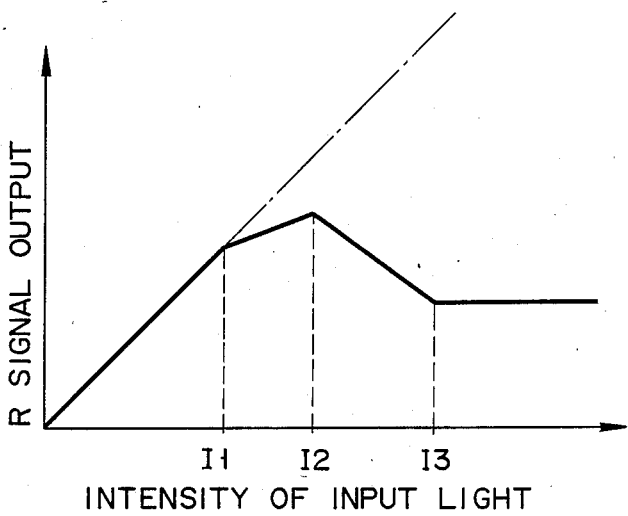
Figure 4:
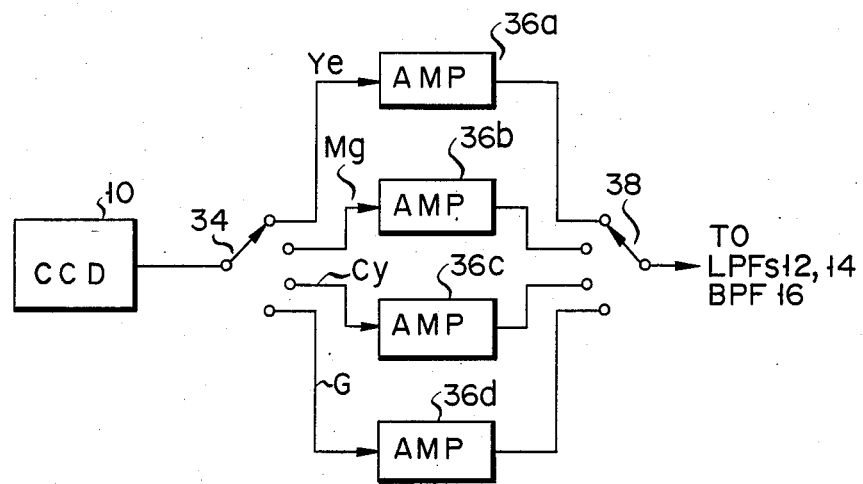
FIG. 4 shows a prior circuit diagram of the circuit for preventing high green phenomenon.
Figure 5:
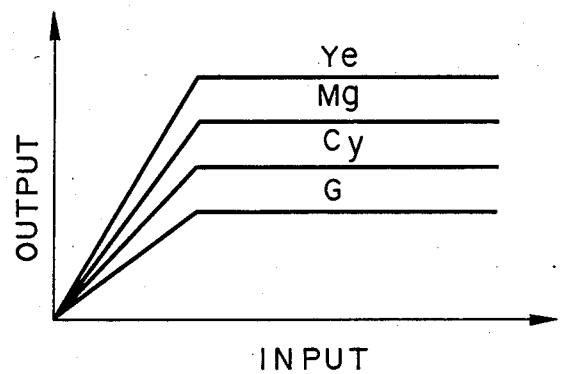
FIG. 5 shows a graph of the characteristic of a saturation type amplifier shown in FIG. 4.
Figure 7:
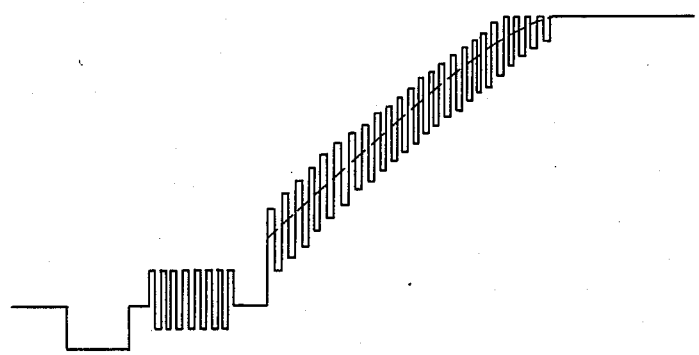
FIG. 7 shows a waveform of a composite video signal for explaining the effect of the white clip as given by the first embodiment.

An example of the composite video signal is illustrated in FIG. 7. In the figure, the color subcarrier signal is the waveform portion modulated as shown by a continuous line, with the luminance signal increasing as shown by a broken line. When the incident light intensity increases and the level of the luminance signal approaches to the saturation level (at which the signal Ye in FIG. 3A is saturated), the amplitude of the color subcarrier signal gradually decreases, and finally the luminance signal alone is left. This fact implies that as the incident light intensity increases, the color gradually fades into white. On the monitor, the color picture appears naturally without any unnatural contoured line in the high light portion.

Figure 8:
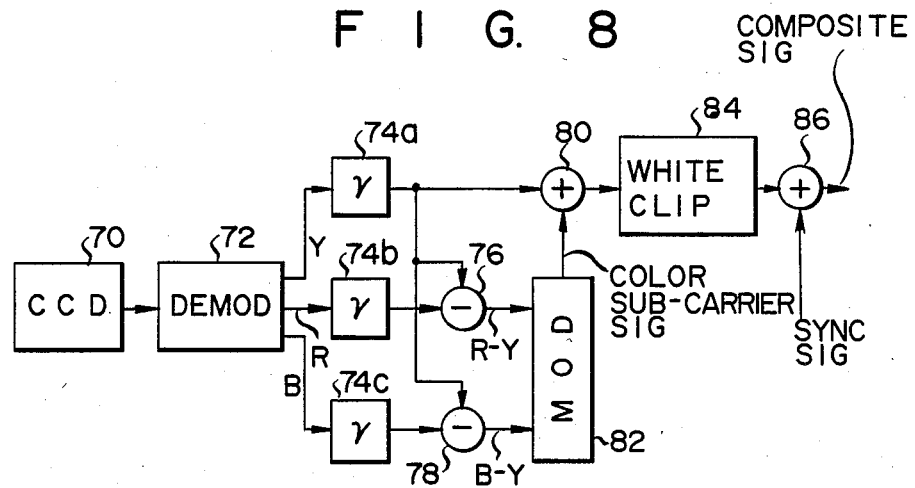
FIG. 8 shows a block diagram of a second embodiment of a color image device according to the present invention.

FIG. 8 shows a block diagram of a second embodiment of a color image pickup device according to this invention. The pixel array of the mosaic filter for color separation in this embodiment is made up of W, Ye and Cy, unlike that of the first embodiment. The output signals W, Ye and Cy from CCD 70 are supplied to demodulator 72. Demodulator 72 generates luminance signal Y, and color signals R and B on the basis of these input signals W, Ye and Cy. The output signals Y, R and B from demodulator 72 are supplied to gamma compensation circuits 74a, 74b and 74c. The outputs from gamma compensation circuits 74a, 74b and 74c are supplied to subtractors 76 and 78, thereby to form color difference signals R−Y and B−Y. These color difference signals are input to modulator 82, which in turn produces a color subcarrier signal at 3.58 MHz. The luminance signal Y from gamma compensation circuit 74a is added to the color subcarrier signal by adder 80. The output signal from adder 80 is applied to white clip circuit 94 to limit the amplitude thereof. The output signal from the white clip circuit 84 is added by adder 86 to the synchronizing signal to generate a composite video signal.

Figure 9:
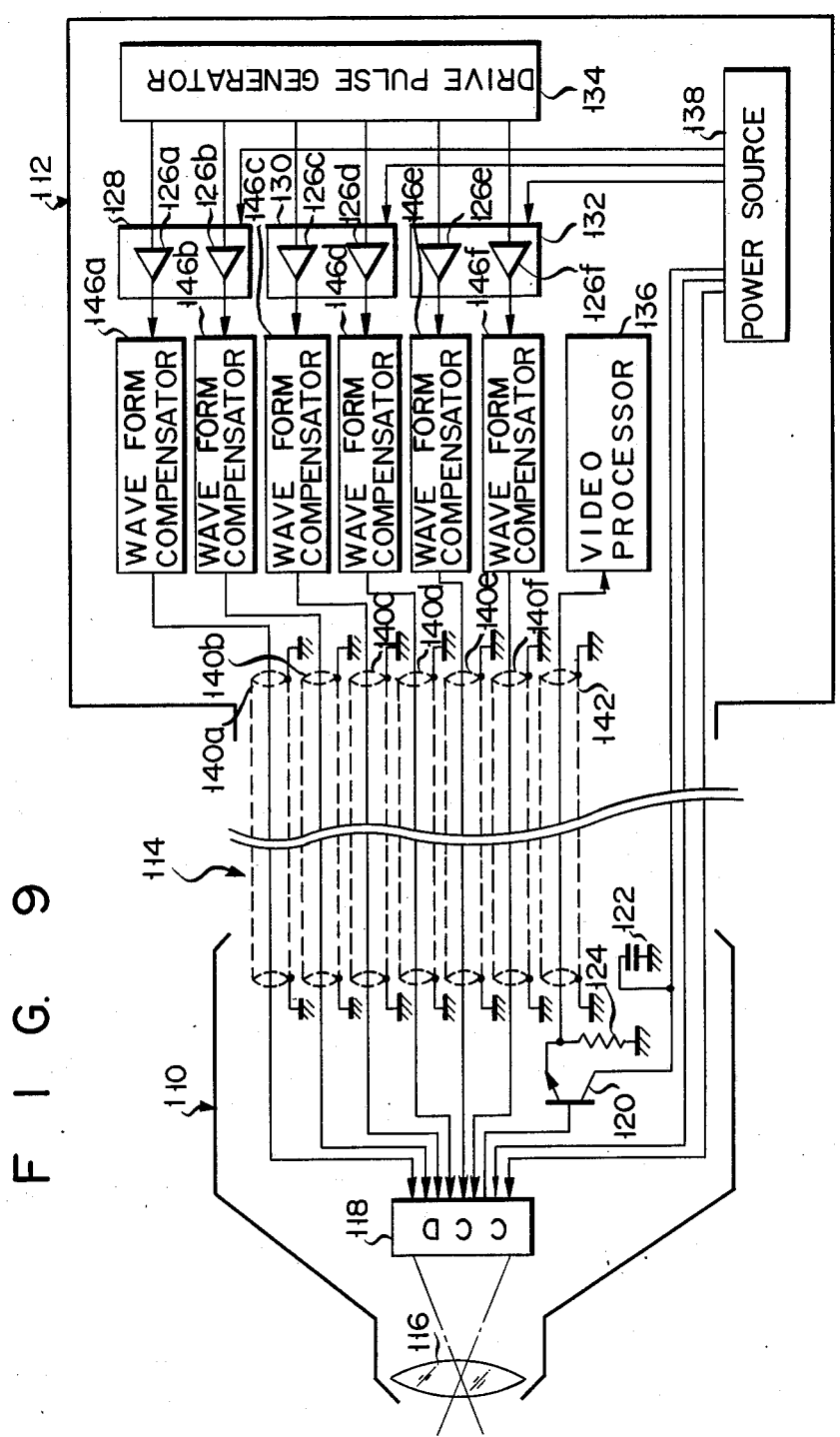
FIG. 9 shows a block diagram of a third embodiment of a color image pickup device according to the present invention.

A third embodiment of this invention will be described referring to FIG. 9. This embodiment is featured in that camera head 110 and camera controller 112 are separately provided and interconnected by cable 114. Camera head 110 contains image pickup lens 116 and solid-state image sensing element, or charge coupled device (CCD) 118. CCD 118 is provided with a color mosaic filter of the above-mentioned complementary color type. The output signal from CCD 118 is applied to the base of the transistor 120 as a buffer amplifier. The collector of transistor 120 is grounded through capacitor 122. The emitter of the transistor is also grounded via resistor 124. Upon application of power voltage at the collector, transistor 120 produces at the emitter the output signal.

Contained in camera controller 112 are drive pulse generator 134, CCD driver ICs 128, 130 and 132 made up of amplifiers 126a to 126f, waveform compensator circuits 146a to 146f, video processor 136 (the circuitry succeeding to the output terminal of CCD 10 in FIG. 6), and power supply circuit 138. Although one driver IC is made up of two amplifiers, this is only by way of example. Drive pulse generator 134 generates drive pulses at predetermined phases for CCD drive. The drive pulse is based on the TTL level. The drive pulses are amplified by amplifiers 126a to 126f to a predetermined voltage level (for example, 12 Vp-p) enough to drive CCD 118. The CCD used in this instance necessitates three drive pulses, each of which is two-phase drive system. Drive pulse generator 134 generates six drive pulses, which in turn are applied to the CCD 118 in camera head 110, by way of amplifiers 126a to 126f, waveform compensation circuits 146a to 146f, and shield lines 140a to 140f. The external conductors of shield lines 140a to 140f are grounded inside camera head 110 and camera controller 112.

Power source circuit 138 supplies DC stabilized voltage as power voltage to the driver ICs 128, 130 and 132, CCD 118, and the collector of transistor 120. These voltages are transferred through normal lines, not shielded lines.

The image pickup signal from the emitter of transistor 120 is transferred to video processor 136 in camera controller 112 by way of shielded line 142. The external conductor of shield line 142 is grounded inside the camera head 110 and camera controller 112. The shield lines 140a to 140f, and 142 form cable 114.

The drive pulses from amplifiers 126a to 126f are inevitably deformed in their waveform during their transfer to CCD 118 through shield lines 140a to 140f. To cope with this waveform deformation, waveform compensator circuits 146a to 146f contrary deform the waveforms of the drive pulses so as to cancel out the deformation of the pulses to be caused during their transfer to CCD 118 through cable 114.

Figure 10:
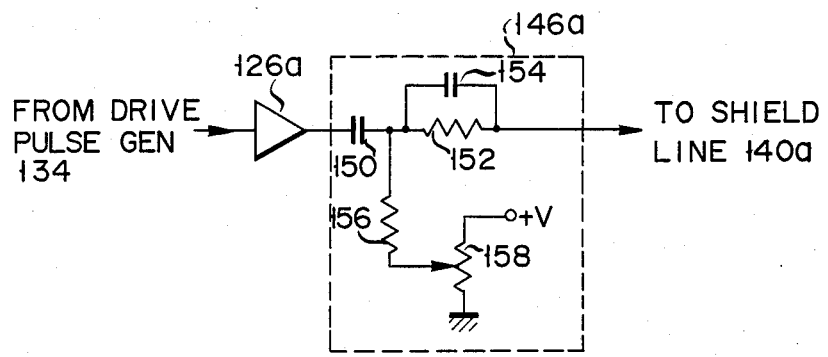
FIG. 10 is a circuit diagram of the waveform compensator circuit of the third embodiment.

An example of waveform compensator circuit 146a is shown in FIG. 10. The output of amplifier 126a is connected to shield line 140a through a series connection of capacitor 150 and resistor 152. Capacitor 154 is connected in parallel with resistor 152. Voltage at a voltage dividing point of variable resistor 158 is supplied to the node between capacitor 150 and resistor 152, through resistor 156. Variable resistor 158 is connected between power source terminal +V and ground terminal. The combination of capacitor 150, resistor 156, and variable resistor 158 forms a differentiating circuit.

Figure 11A:
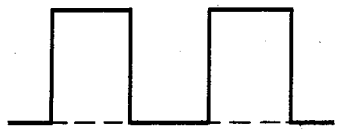
FIGS. 11A to 11C show waveforms for illustrating the operation of the waveform compensator circuit of FIG. 10.
Figure 11B:
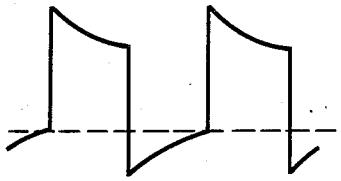
Figure 11C:
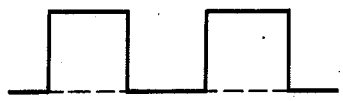

Waveform compensator circuits 146a to 146f shape the waveform of the rectangular input drive pulse as shown in FIG. 11A into that of FIG. 11B. The drive pulse as shown in FIG. 11B is transmitted through shield lines 140a to 140f to CCD 118. As described above, the waveform of the drive pulse is deformed during its transfer. Therefore, the waveform of the drive pulse is restored to its original waveform, or the rectangular waveform, as shown in FIG. 11C, when it is transmitted to CCD 118 through cable 114. The reshaped waveform of the drive pulse takes the same waveform as that of the original one, but the amplitude thereof is reduced somewhat. To compensate for the amplitude reduction, the pulse signal whose voltage level is larger than that of the pulse signal to be supplied to CCD 118, is supplied from drive pulse generator 134 to waveform compensator circuits 146a to 146f. Variable resistor 158 adjusts the DC level of the drive pulse so that the "0" level of the signal as indicated by broken line in FIGS. 11A to 11C is at 0 V.

As seen from the foregoing, in the third embodiment of this invention, the driver ICs 128, 130 and 132 for amplifying the drive pulse of the predetermined phase to the predetermined amplitude, are provided in the camera controller 112, not in the camera head 110. With such structural features, the size of the camera head 110 is reduced. Further, it is possible to prevent increase of the dark current of CCD 118, which is due to the heat generated from driver ICs 128, 130 and 132. It is further noted that in the third embodiment, the waveform compensator circuits 146a to 146f are inserted in the transfer path of the drive pulse to camera head 110, in order to previously compensate for the deformation of the drive pulse waveform which occurs during the transfer path from the driver ICs to camera head 110. This feature allows camera head 110 to be disposed separated from camera controller 112 at a sufficient distance. Therefore, the image pickup device according to the third embodiment is well applicable for he endoscope for examining the interior a human body, for example, and the industrial camera for visualizing the interior of a hollow member.

Figure 12:
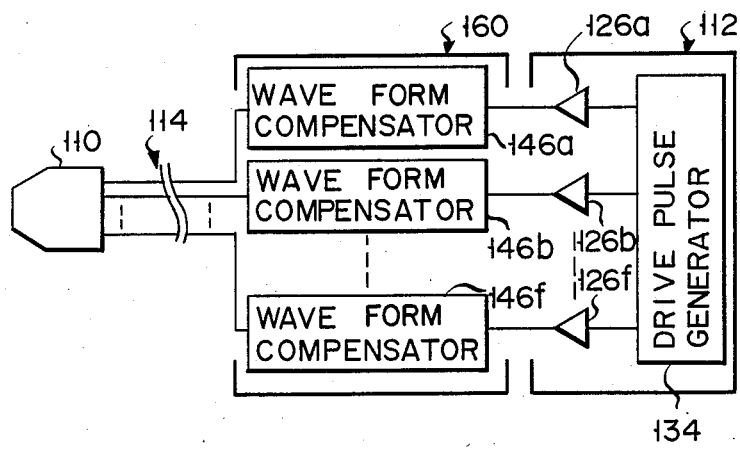
FIG. 12 shows a block diagram of a fourth embodiment of a color image pickup device according to the present invention.

A fourth embodiment of the image pickup device according to this invention is illustrated in FIG. 12. In this embodiment, cable line 114 is connected to camera controller 112, through connector plug 160 (intermediate adaptor), not directly. In this case, waveform compensator circuits 146a to 146f may be provided inside the connector plug 160, not inside the camera controller 112.

Figure 13:
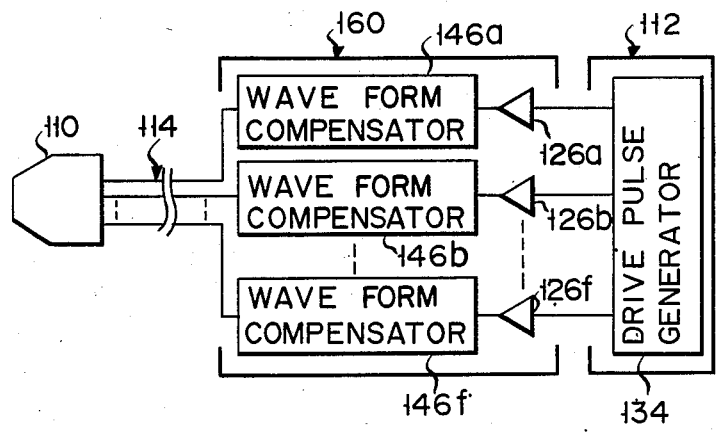
FIG. 13 shows a block diagram of a fifth embodiment of a color image pickup device according to the present invention.

As shown in a fifth embodiment of this invention shown in FIG. 13, the amplifiers 126a to 126f, which form the CCD driver IC, and waveform compensators 146a to 146f may be disposed in connector plug 160. Additionally, waveform compensator circuits 146a to 146f or both these circuits and amplifiers 126a to 126f may be installed in cable 114.

A sixth embodiment of this invention is illustrated in FIG. 14. This embodiment, as a modification of the third embodiment for its improvement, is designed with an intention to reduce the number of signal lines contained in the cable 114 between camera head 110 and camera controller 112.

The third embodiment needed a total of ten signal lines; six signal lines for drive pulse transmission, three signal lines for power voltage supply, and one signal line for image pickup signal transfer. In the sixth embodiment, the outside conductors of the shield lines are used for three signal lines for power voltage supplying to CCD 118 and transistor 120. In this instance, the DC bias voltage applied to CCD 118 is transferred to camera head 110 via the outside conductors of shield lines 140e and 140f. The power supply DC stabilized voltage applied to the collector of transistor 120 is transferred to camera head 110, through the outside conductor of shield line 142 for image pickup signal transferring. The external conductors of shield lines 140e and 140f are grounded inside the camera head 110, through capacitors 164 and 166. These capacitors AC grounds the shield lines 140e and 140f. The external conductor of shield line 142, together with the collector of transistor 120, is also grounded, inside the camera head 110, through capacitor 122.

The sixth embodiment can more reduce the number of signal lines in the cable 114 connecting camera head 110 and camera controller 112 than the third embodiment.

It should be understood that this invention may variously be changed and modified within the scope of this invention. For example, the solid state image sensing device may be other elements than the CCDs. An array of pixels of the mosaic filter for color separation may appropriately be modified. The signal read out system for reading out signals from the solid state image sensing device is not limited to the above-mentioned one, i.e., the field storage mode.

As described above, a single plate type image pickup system, which uses the solid state image pickup element with a complementary type color separation filter, can make the gamma compensation equally for all of the color components. The device can reproduce hue accurately. With a simple construction, the high light green phenomena can be prevented. Further, the camera head and the camera controller are separately disposed, thereby reducing the size of the camera head.

What is claimed is:

1. A color image pickup device comprising:
    a solid-state image sensing element having a complementary color type mosaic filter;
    means for extracting a luminance signal and a first color-difference signal from an output signal of said solid-state image sensing element;
    first compensation means for compensating for a gamma characteristic of the luminance signal extracted by said extracting means and for outputting a gamma-compensated luminance signal;
    means for generating a first color signal on the basis of the luminance signal and the first color-difference signal extracted by said extracting means;
    second compensation means for compensating for a gamma characteristic of said first color signal and for outputting a gamma-compensated first color signal; and
    means for generating a second color-difference signal on the basis of the gamma-compensated luminance signal and the gamma-compensated first color signal.

2. A color image pickup device according to claim 1, in which said complementary color type mosaic filter comprises a plurality of unit arrays of pixels, each of said unit arrays comprising two columns and four rows of pixels.

3. A color image pickup device according to claim 1, further comprising:
    modulating means for generating a color subcarrier signal on the basis of the second color-difference signal;
    means for adding together the color subcarrier signal generated by said modulating means and the gamma-compensated luminance signal to produce an output signal;
    white clip means for limiting the amplitude of the output signal produced by adding means; and
    means for adding a synchronizing signal to the amplitude-limited output signal to generate a composite video signal.

4. A color image pickup device according to claim 1, in which said extracting means comprises a first lowpass filter for extracting a broad-band luminance signal, a second lowpass filter for extracting a narrow-band luminance signal, and a bandpass filter for extracting a signal containing the first color difference signal.

5. A color image pickup device according to claim 1, further comprising:
- a camera head provided with said solid-state image sensing element;
- a controller including means for generating drive pulses having a predetermined phase for driving said solid-state image sensing element, amplifying means for amplifying the drive pulses generated by said generating means to generate drive pulses having a predetermined amplitude necessary for driving said solid-state image sensing element; and means for compensating the waveform of the drive pulses generated by said amplifying means so as to compensate in advance for deformation of the waveform of the drive pulses which occurs when the drive pulses are transmitted, and for transmitting the waveform-compensated drive pulses to said solid-state image sensing element; and
- cable means for connecting said camera head to said controller.

6. A color image pickup device according to claim 5, in which said waveform compensating means includes differentiating means.

7. A color image pickup device according to claim 5, in which said cable means includes shielded lines for transmitting said waveform-compensated drive pulses.

8. A color image pickup device according to claim 7, in which said controller further includes a power source connected to said solid-state image sensing element through external shielding conductors of said shielded lines.

* * * * *